(12) United States Patent
Gastaldi

(10) Patent No.: US 8,608,959 B2
(45) Date of Patent: Dec. 17, 2013

(54) DEVICE FOR PICKING UP OBJECTS FLOATING ON THE WATER, SUCH AS HYDROCARBONS

(76) Inventor: Robert Gastaldi, Suresnes (FR)

( * ) Notice: Subject to any disclaimer, the term of this patent is extended or adjusted under 35 U.S.C. 154(b) by 334 days.

(21) Appl. No.: 13/122,021

(22) PCT Filed: Sep. 30, 2009

(86) PCT No.: PCT/EP2009/062709
§ 371 (c)(1),
(2), (4) Date: Jul. 19, 2011

(87) PCT Pub. No.: WO2010/037791
PCT Pub. Date: Apr. 8, 2010

(65) Prior Publication Data
US 2011/0303601 A1     Dec. 15, 2011

(30) Foreign Application Priority Data
Oct. 1, 2008   (FR) ...................... 08 56651

(51) Int. Cl.
*E02B 15/04*     (2006.01)
*E02B 15/10*     (2006.01)
*B01D 17/02*     (2006.01)

(52) U.S. Cl.
CPC .............. *E02B 15/048* (2013.01); *E02B 15/10* (2013.01); *B01D 17/0214* (2013.01); *Y10S 210/923* (2013.01)
USPC ................ 210/170.05; 210/242.1; 210/242.3; 210/536; 210/538; 210/923; 405/68

(58) Field of Classification Search
USPC .............. 210/170.05, 170.09, 170.11, 242.1, 210/242.3, 533, 536, 538, 747.6, 776, 923; 405/66, 68, 69
See application file for complete search history.

(56) References Cited

U.S. PATENT DOCUMENTS

| | | | |
|---|---|---|---|
| 3,508,652 A * | 4/1970 | Woolley ..................... | 210/242.3 |
| 3,662,891 A | 5/1972 | Headrick | |
| 3,693,801 A * | 9/1972 | Pogonowski .............. | 210/242.3 |
| 3,875,062 A * | 4/1975 | Rafael ........................ | 210/242.3 |
| 4,104,884 A * | 8/1978 | Preus ............................. | 405/68 |
| 4,295,755 A * | 10/1981 | Meyers ......................... | 405/66 |
| 4,372,854 A | 2/1983 | Szereday | |
| 4,428,319 A | 1/1984 | Henning et al. | |
| 4,988,438 A * | 1/1991 | Eddleman ................. | 210/242.3 |
| 5,073,261 A * | 12/1991 | Conradi et al. ............ | 210/242.1 |
| 5,409,607 A * | 4/1995 | Karlberg ................... | 210/242.3 |
| 5,478,480 A * | 12/1995 | Winstone ................ | 210/170.05 |
| 5,711,634 A | 1/1998 | Oberg | |
| 5,860,252 A * | 1/1999 | Oberg ............................ | 405/68 |

* cited by examiner

*Primary Examiner* — Christopher Upton
(74) *Attorney, Agent, or Firm* — Bachman & LaPointe, P.C.

(57) ABSTRACT

A device for picking up floating objects on the water, such as hydrocarbons, has an envelope made of a flexible material impervious to water and to the floating objects, having a mouth at the upstream end and a discharge orifice at the downstream end, a folding rigid framework, arranged inside the envelope and attached thereto at the mouth and at the discharge orifice, at least one inflatable tube attached to the envelope and running along the length of the envelope, and a compressed-gas generation device designed to inflate the or each inflatable tube.

22 Claims, 9 Drawing Sheets

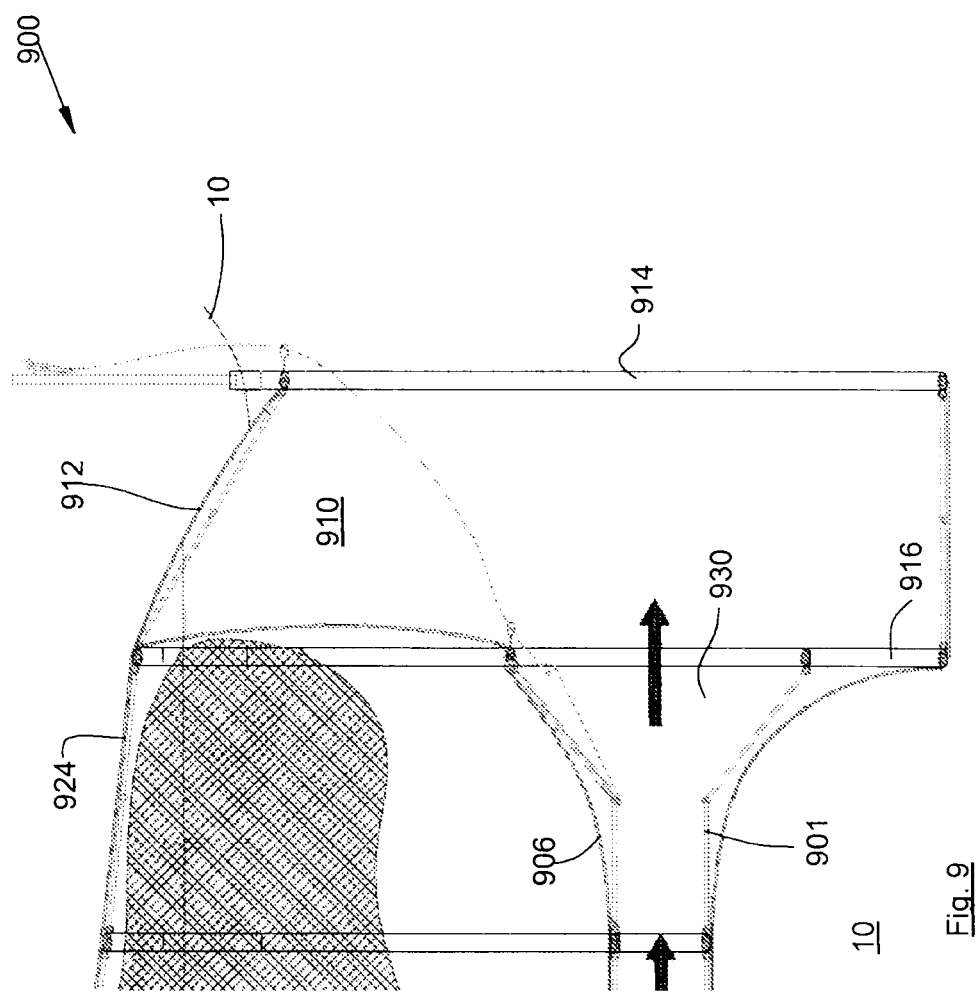

DEVICE FOR PICKING UP OBJECTS FLOATING ON THE WATER, SUCH AS HYDROCARBONS

BACKGROUND

The present invention concerns a device for picking up objects floating on water such as hydrocarbons.

Devices for picking up objects floating on water are known that comprise nets the mesh of which is such that the water can pass through it but the floating objects cannot and thus remain in the net. This type of net does not make it possible to obtain very satisfactory results since it often happens that the objects and in particular hydrocarbons manage to pass through the mesh.

SUMMARY OF THE INVENTION

An aim of the present invention is to propose a device for picking up objects floating on water such as hydrocarbons that does not have the drawbacks of the prior art and in particular enables said floating objects to be picked up effectively.

For this purpose, a device is proposed for picking up objects floating on water such as hydrocarbons and comprising:

an envelope produced from a flexible material impermeable to water and to floating objects, having a mouth upstream and a discharge orifice downstream, a foldable rigid framework, disposed inside the envelope and fixed to the latter at said mouth and said discharge orifice, at least one inflatable tube fixed to the envelope and extending over the length of the envelope, and a device for generating compressed gas designed to inflate the or each inflatable tube.

Advantageously, the or each inflatable tube is disposed so that, when it is deployed, it is out of the water.

Advantageously, the framework comprises a main ring, upstream rings disposed upstream of the main ring, downstream rings disposed downstream of the main ring and extension links connecting each ring to the adjacent ring or rings.

Advantageously, the dimensions of the upstream rings decrease in the direction of the front of the picking-up device.

Advantageously, the downstream ring that is furthest downstream supports a holding bar to which part of the envelope forming the upper limit of the discharge orifice is fixed.

Advantageously, said part is extended towards the front of the envelope, and this extension is fixed to the rings that it passes through by fixing bars so as to form a tunnel.

Advantageously, the picking-up device comprises a helix disposed in said tunnel and the rotation axis of which is parallel to the direction of progress of the picking-up device and driving means intended to drive said helix in rotation.

Advantageously, the driving means comprise a shaft, at least one bladed wheel mounted on said shaft and a set of driving bars and pinions that convert the rotation of the bladed wheel or wheels into a rotation of the helix.

Advantageously, the picking-up device comprises a first obturation device designed to adopt alternately an obturation position in which nothing can enter through the mouth and an open position in which the water and floating objects can enter the mouth, and comprising activation means that can be controlled from the surface.

Advantageously, the first obturation device comprises a deflection flap mounted at the top part of the mouth by means of a hinge with a horizontal axis and perpendicular to the direction of progress of the picking-up device.

Advantageously, the deflection flap floats.

Advantageously, the first obturation device comprises a plunge flap mounted at the bottom part of the mouth by means of a hinge with a horizontal axis and perpendicular to the direction of progress of the picking-up device.

Advantageously, the plunge flap sinks.

Advantageously, the picking-up device comprises, just downstream of the mouth, a floating flap mounted so as to rotate freely about a horizontal axis perpendicular to the direction of progress of the picking-up device.

Advantageously, the picking-up device comprises a second obturation device designed to adopt alternately an obturation position in which nothing can leave through the discharge orifice and an open position in which water can leave through the discharge orifice, and comprising activation means that can be controlled from the surface.

Advantageously, the picking-up device comprises a skirt extending rearwards in extension of the envelope and the free edge of which is sufficiently rigid to stay open.

Advantageously, the cross section of the mouth is less than or equal to the cross section of the discharge orifice.

Advantageously, the picking-up device comprises floats fixed at the top part of the envelope.

Advantageously, the picking-up device comprises a ballast fixed to the base of the picking-up device.

Advantageously, the envelope has access for accessing the inside of the envelope and the picking-up device comprises a lining covering the internal volume of the envelope and removably fixed to the framework and optionally to the envelope.

Advantageously, the picking-up device comprises a vent comprising a body and a float, the body being fixed by its base and having a high stop and low stop position between said base and said high stop, and the float being disposed inside the body between the low stop and the high stop.

Advantageously, the diameter of the discharge orifice broadens going towards the downstream end of the picking-up device.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIG. 9 is a view of a detail of a discharge orifice according to another embodiment.

DETAILED DESCRIPTION OF THE PREFERRED EMBODIMENT(S)

Figure 3:
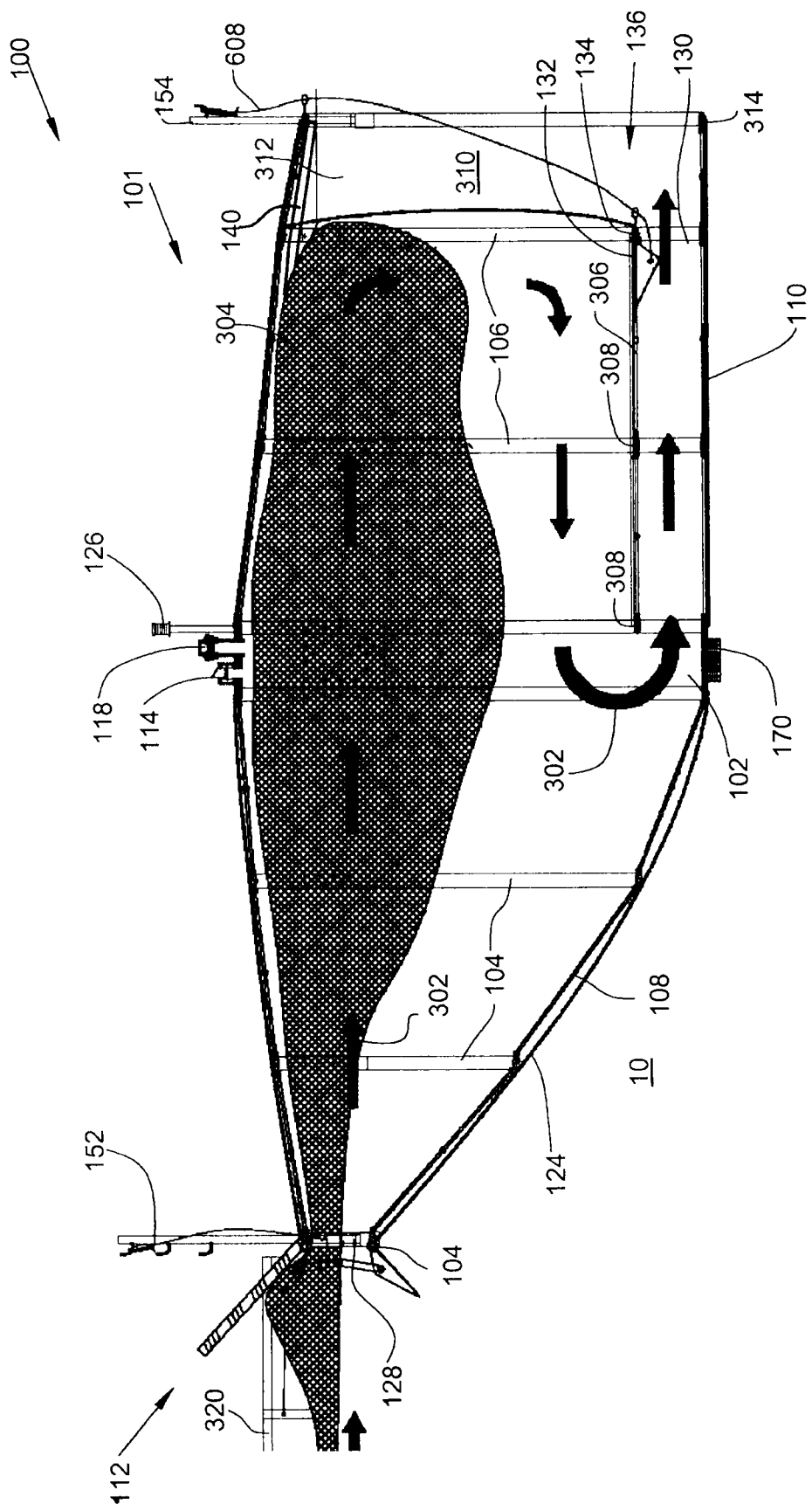
FIG. 3 is a view in section of the device for picking up floating objects of FIG. 1 in the picking-up position.

In the following description, the terms relating to a position are taken with reference to a device for picking up floating objects in the picking-up position, that is to say when it is in the water and towed as shown in FIG. 3. The upstream and downstream directions are taken as a reference with respect to the direction of movement of a picking-up device when it is towed in the picking-up position.

Figure 1:
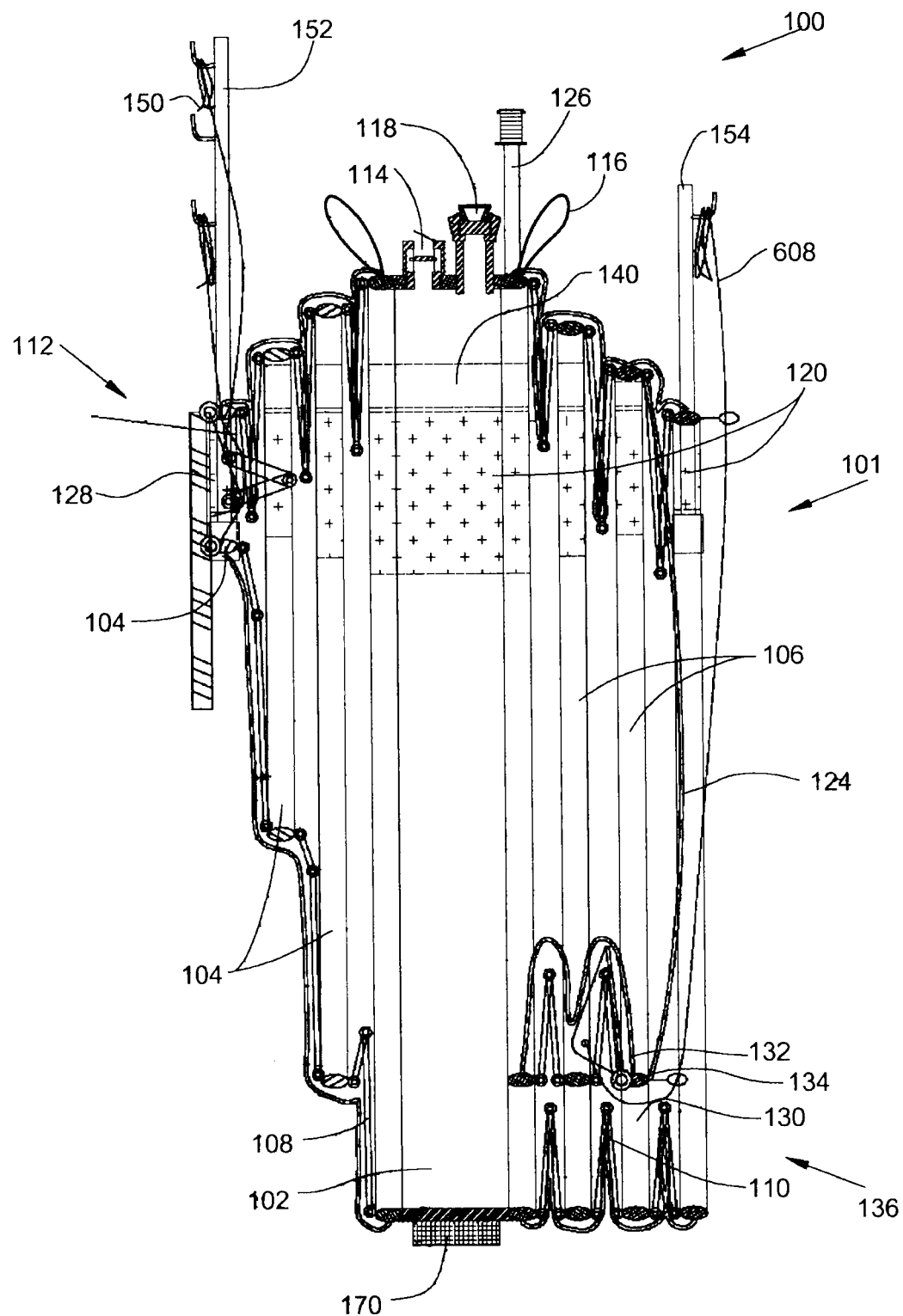
FIG. 1 is a view in section of a device for picking up floating objects according to the invention in the release position.

FIG. 1 shows a device 100 for picking up floating objects on the water such as hydrocarbons according to the invention. The picking-up device 100 is in a release phase, that is to say in a phase during which the picking-up device 100 is folded and can be transported to the picking-up sites, for example by a helicopter and released into the water.

Figure 2:
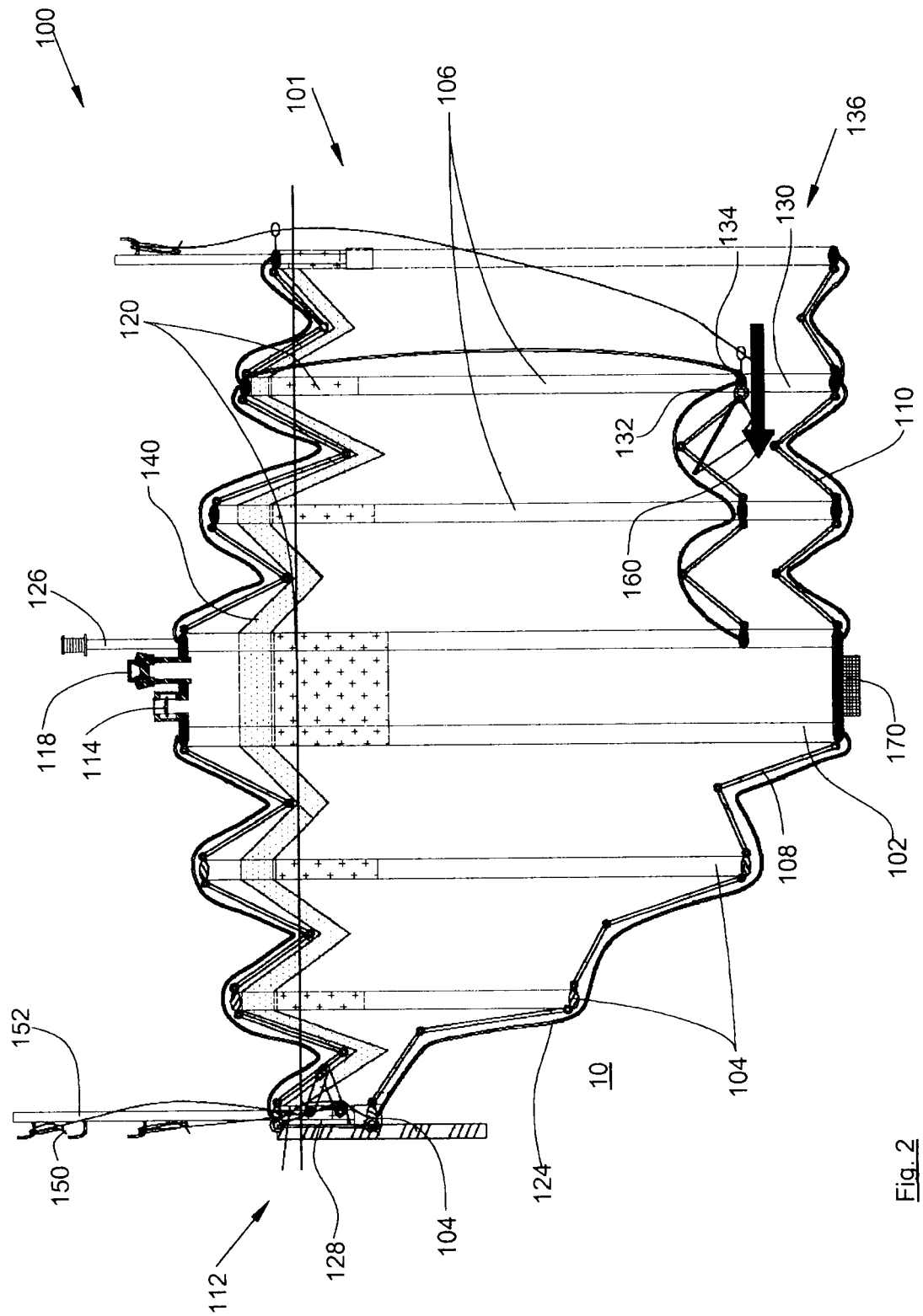
FIG. 2 is a view in section of the device for picking up floating objects of FIG. 1 in the inflation position.

FIG. 2 shows the picking-up device 100 in an inflation phase, that is to say in a phase during which the picking-up device 100 begins to be deployed in the water 10.

FIG. 3 shows a picking-up device 100 in a picking-up phase, that is to say in a phase during which the picking-up device 100 is fully deployed in the water 10 and is towed by at least one boat in order to pick up the floating objects.

The picking-up device 100 comprises:
a foldable rigid framework 101, and
an envelope 124 produced from a flexible material impermeable to water and to floating objects, and in which the framework 101 is disposed.

The framework 101 is preferably produced from metal material and comprises a main ring 102, upstream rings 104 disposed upstream of the main ring 102, downstream rings 106 disposed downstream of the main ring 102 and extension links 108 and 110. The number of upstream rings 104 and downstream rings 106 depends on the volume capacity of the envelope 124. For example, in the case of the envelope 124 shown in FIG. 1 with a length of 10 m and a volume capacity of 50 m$^3$, three upstream rings 104 and two downstream rings 106 are provided.

Each ring 102, 104, 106 can take various forms such as for example a circular or rectangular form, and the rings 102, 104 and 106 are disposed one after the other. The axes of the different rings 102, 104, 106 are all substantially parallel to the direction along which the picking-up device 100 is towed.

Each ring 102, 104, 106 is connected to the adjoining ring or rings by extension links 108 and 110. Each link 108, 110 is designed to take a folding position and an unfolding position. In its folding position, the link 108, 110 is such that two rings 102, 104, 106 that it connects are close to each other, which corresponds to the release phase of FIG. 1 of the picking-up device 100. In its unfolding position, the link 108, 110 is such that the two rings 102, 104, 106 that it connects are distant from each other, which corresponds to the picking-up phase of FIG. 3 of the picking-up device 100.

In the embodiment of the invention presented here, each link 108, 110 comprises two rods connected together by a swivel secured to a free end of each of two rods, the free end of one rod being connected to one of the rings and the free end of other rod being connected to the other ring.

In the embodiment of the invention presented here, the envelope 124 consists of an upstream half-envelope that is fixed to the main ring 102 and envelops the upstream rings 104 and a downstream half-envelope that is fixed to the main ring 102 and envelops the downstream rings 106. The envelope 124 is fixed to the framework 101 by any suitable fixing means. The envelope 124 is produced from a flexible material so as to be folded and strong in order to resist forces. The material used may for example be of the synthetic rubber or elastomer type. Naturally it is possible to provide for the envelope 124 to be in a single piece.

The envelope 124 comprises, upstream, a mouth 128 and, downstream, a discharge orifice 130. The framework 101 is fixed to the envelope 124 at the mouth 128 and the discharge orifice 130.

To prevent a difference in flow rate in the mouth 128 and the discharge orifice 130, which could cause overpressure inside the envelope 124, the cross section of the mouth 128 is less than or equal to the cross section of the discharge orifice 130.

To prevent the appearance of a vortex phenomenon at the discharge orifice 130 when floating objects are picked up, which would cause them to be discharged through the discharge orifice 130, the latter must be disposed at a sufficient depth. In the embodiment of the invention presented here, the height of the envelope is 3 m, which corresponds substantially to the depth at which the discharge orifice 130 is situated.

When the picking-up device 100 is in the picking-up phase the mouth 128 is partly situated above the level of the water 10 and partly under the level of the water 10 to enable a thickness of water and objects that are floating on its surface to enter said mouth 128. The mouth 128 is delimited by the internal dimensions of the upstream ring 124 furthest upstream to which the envelope 124 is fixed. In order to produce the mouth 128, the dimensions of the upstream rings 104 decrease going towards the front of the picking-up device 100 so as to form substantially a truncated cone, the vertex of which is open and forms the mouth 128 and is oriented towards the front of the picking-up device 100. In a particular embodiment of the invention, the dimensions of the mouth 128 and ring 104 are around 3 m*0.4 m.

When the picking-up device 100 is in the picking-up phase, the discharge orifice 130 is situated at the bottom part of the envelope 124 and below the level of the water 10 to enable the water 10 to leave and to hold the objects floating in the envelope 124. For this purpose the envelope 124 is open at the rear and at the bottom part. To hold the part 132 of the envelope 124 that forms the upper limit of the discharge orifice 130, the downstream ring 106, furthest downstream, supports a holding bar 134 to which said part 132 is fixed.

In the embodiment of the invention presented here, the main ring 102, the upstream ring 104 furthest upstream and the downstream ring 106 furthest downstream are secured to the envelope 124. The main ring 102 comprises the elements necessary for the manipulation and use of the picking-up device 100. For example, the main ring 102 carries a vent 114, a pumping coupling 118, handling rings 116, a signalling light 126, a location beacon, etc.

The pumping coupling 118 makes it possible to connect a pump for the purpose of draining the envelope 124.

The handling rings 116 make it possible to attach the picking-up device 100 to a helicopter or to any other transport means in order to transport it.

The signalling light 126 and the locating beacon enable the picking-up device 100 to be located when it is filled and has been separated from the boat that was towing it.

The structure of the picking-up device 100 must be such that, when it is released in the release position in the water 10, the mouth 128 is at the top and the discharge orifice 130 is at the bottom. To facilitate this positioning, floats 120, formed for example by foam elements, are fixed at the top part of the envelope 124. To improve this positioning, a ballast 170 is fixed to the base of the picking-up device 100.

The picking-up device 100 comprises at least one, and preferably two, inflatable tubes 140, fixed to the envelope 124 and on either side thereof and preferably outside it. When it is inflated, each inflatable tube 140 extends substantially horizontally over the length of the envelope 124 so as to allow complete unfolding of the framework 101 and envelope 124, that is to say at least between the upstream ring 104 carrying the mouth 128 and the downstream ring 106 carrying the discharge orifice 130. Thus, when it is inflated, each inflatable tube 140 is situated on one of the lateral flanks of the picking-up device 100.

A device for generating compressed gas is provided for inflating each inflatable tube 140. For example, the device generating compressed gas consists of a set of cartridges of compressed gas, in particular air, each being disposed in an inflatable tube 140, and each compressed gas cartridge can be activated from the outside of the inflatable tube 140 by means of a remote switch 150, which is preferably disposed on a mast 152 that rises above the level of the water 10 in front of the picking-up device 100. When the compressed gas cartridges are activated, the inflatable tubes 140 inflate, causing the deployment of the envelope 124 and foldable framework 101, which pass through the inflation phase to reach the picking-up phase.

To prevent the lifting of the picking-up device 100, the inflatable tubes 140 are disposed so that, when they are deployed, they are out of the water 100.

The simple structure, the ease of implementation and the use of an impermeable envelope 124 make the picking-up device 100 a high-performance device.

A first obturation device 112 is provided for closing off the mouth 128. The first obturation device 112 is such that it can adopt alternately an obturation position in which nothing can enter the envelope 124 through the mouth 128 and an open position in which the water 10 and the floating objects can enter the mouth 128. In general terms, the first obturation device 112 is in the obturation position during the phases of release, inflation of the envelope 124 and transportation of the picking-up device 100 to an emptying zone after filling thereof. And the first obturation device 112 is in the open position during the phase of picking up the floating objects.

To prevent outflow of the floating objects stored in the envelope 124 during towing of the device once filled, a second obturation device 136 is provided for closing off the discharge orifice. The second obturation device 136 is such that it can adopt alternately an obturation position in which nothing can leave the envelope 124 through the discharge orifice 130 and an open position in which the water 10 can leave through the discharge orifice 130. In general terms, the second obturation device 136 is in the obturation position during the phase of transportation of the picking-up device 100 to an emptying zone after filling thereof. And the second obturation device 136 is in the open position during the phases of release of the envelope 124, inflation of the envelope 124 and picking up of the floating objects.

In order to be towed by one or two boats, the picking-up device 100 comprises towing cables that are fixed in the vicinity of the mouth 128. Advantageously, each towing cable is fixed to the envelope 124 by means of a floating barrage 320 that is itself integrated in the picking-up device 100. Thus, during picking up, the floating barrages form a funnel that directs the floating objects towards the mouth 128. Each floating barrage 320 can also be inflated by means of the compressed gas generation device.

The towing of the picking-up device 100 in the picking-up phase causes the creation of a current of water 302 inside the envelope 124. The current of water 302 drives the floating objects 304 to the rear of the envelope 124, and, to prevent the floating objects 304 leaving through the discharge orifice, the envelope 124 has a fold 306 that forms a return inside the envelope 124. The fold 306 extends substantially horizontally towards the front of the envelope 124 extending the part 132 of the envelope 124 that forms the upper limit of the discharge orifice 130 and the holding bar 134. In the embodiment presented in FIG. 3, the fold 396 extends as far as the main ring 102 through each of the downstream rings 106. The fixing of the fold 396 to the rings 102 and 106 that it passes through is provided by fixing bars 308 fixed to said rings 102 and 106. The fold 306 thus forms a tunnel through which the water 10 is discharged. The current of water 302 thus has, from the rear of the picking-up device 100, a return towards the front of the picking-up device 100 and a new change of direction towards the rear of the picking-up device 100 at the entrance of the tunnel.

To facilitate discharge of the water 10 through the discharge orifice 130, a negative-pressure zone 310 is created at the rear of the envelope 124. The negative-pressure zone 310 is created here by the fitting of a substantially cylindrically shaped skirt 312 that extends towards the rear of the picking-up device 100 and in line with the envelope 124. The skirt 312 extends the envelope 124 and its free edge is sufficiently rigid to stay open; for example the fitting of a holding ring 314 along the free edge facilitates such holding. The free edge of the skirt 312 is designed to remain under the level of the water 10.

Figure 4:
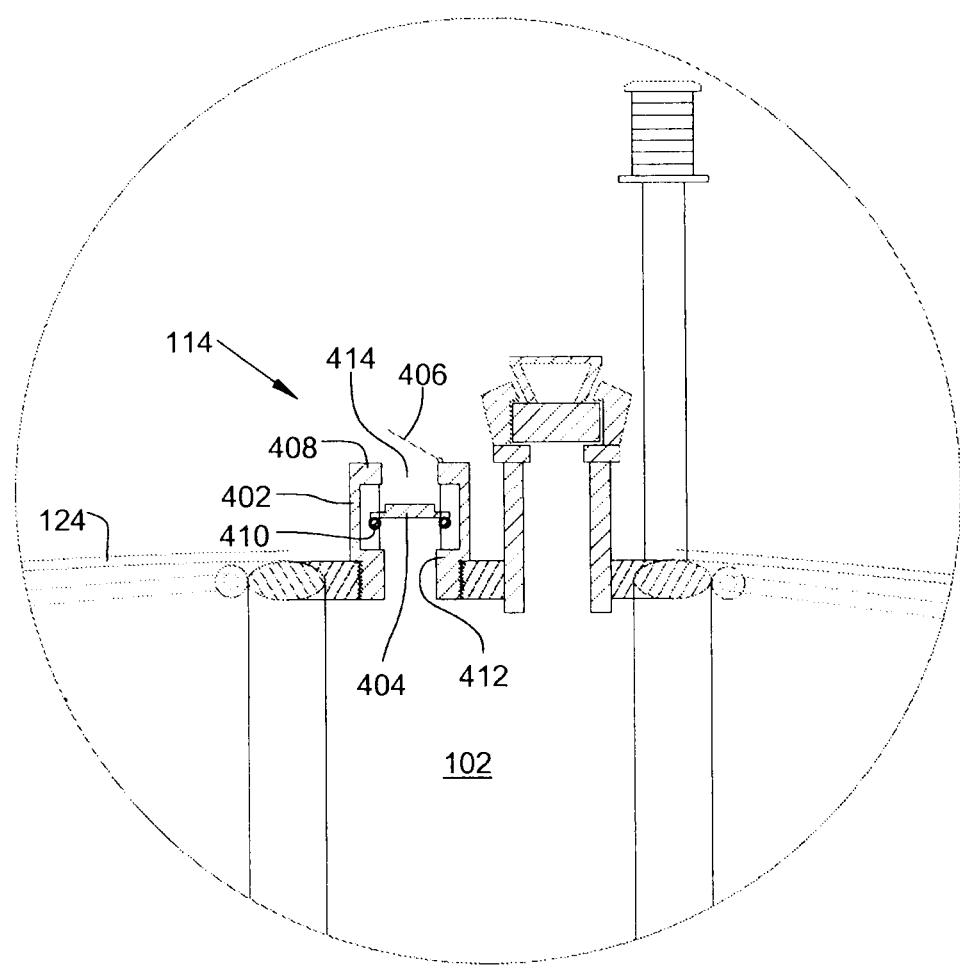
FIG. 4 is a detail of a vent of the device for picking up floating objects according to the invention.

FIG. 4 shows the vent 114 in cross section. The vent 114 discharges the air contained in the envelope 124 when the floating objects 304 are picked up. The vent 114 comprises a body 402 and a float 404.

The body 402 is in the form of a cylinder with a vertical axis and hollow. The base 412 of the cylinder is fixed to the main ring 102. The body 402 comprises a high stop 408 and a low stop 410. In the embodiment of the invention presented here, the high stop 408 is formed by a horizontal rim that extends at the top of the cylinder 402 towards the inside thereof. The high stop 408 delimits an opening 414. The low stop 410 is positioned between the base 412 and the high stop 408. The low stop 410 is here formed by studs that project towards the inside of the cylinder 402.

The float 404 is disposed inside the body 402 between the low stop 410 and the high stop 408 and the density thereof is such that it floats on the hydrocarbons. The float 404 is able to move in translation inside the body 402 between a low position in which it rests on the low stop 410 and a high position in which it comes into abutment under the high stop 408. The dimensions of the float 404 are less than the internal dimensions of the cylinder 402, thus creating a passage through which air can flow. In the high position, the float 404 closes off the opening 414 and prevents discharge of the water 10 or floating objects, and in particular hydrocarbons, through the opening 41 when the hydrocarbons fill the envelope 124. In the low position, the float 404 allows discharge of air through the opening 414, in particular during picking up.

In a preferred embodiment, the vent 114 also comprises a valve 406 mounted on the body 402 and able to move in rotation about a hinge with a horizontal axis between a closed position in which it closes off the opening 414 and an open position in which it leaves free the passage through the opening 414. In the closed position, the valve 406 is pressed against the opening 414 and in the open position the valve 406 is raised. Passage into the open position takes place when there is an overpressure inside the envelope 124, which enables air to be discharged from the envelope 124, this position corresponding to the low position of the float. In the closed position, the valve 406 prevents air from entering the envelope 124; this position is particularly interesting, in the inflation phase, as explained below.

Figure 6:
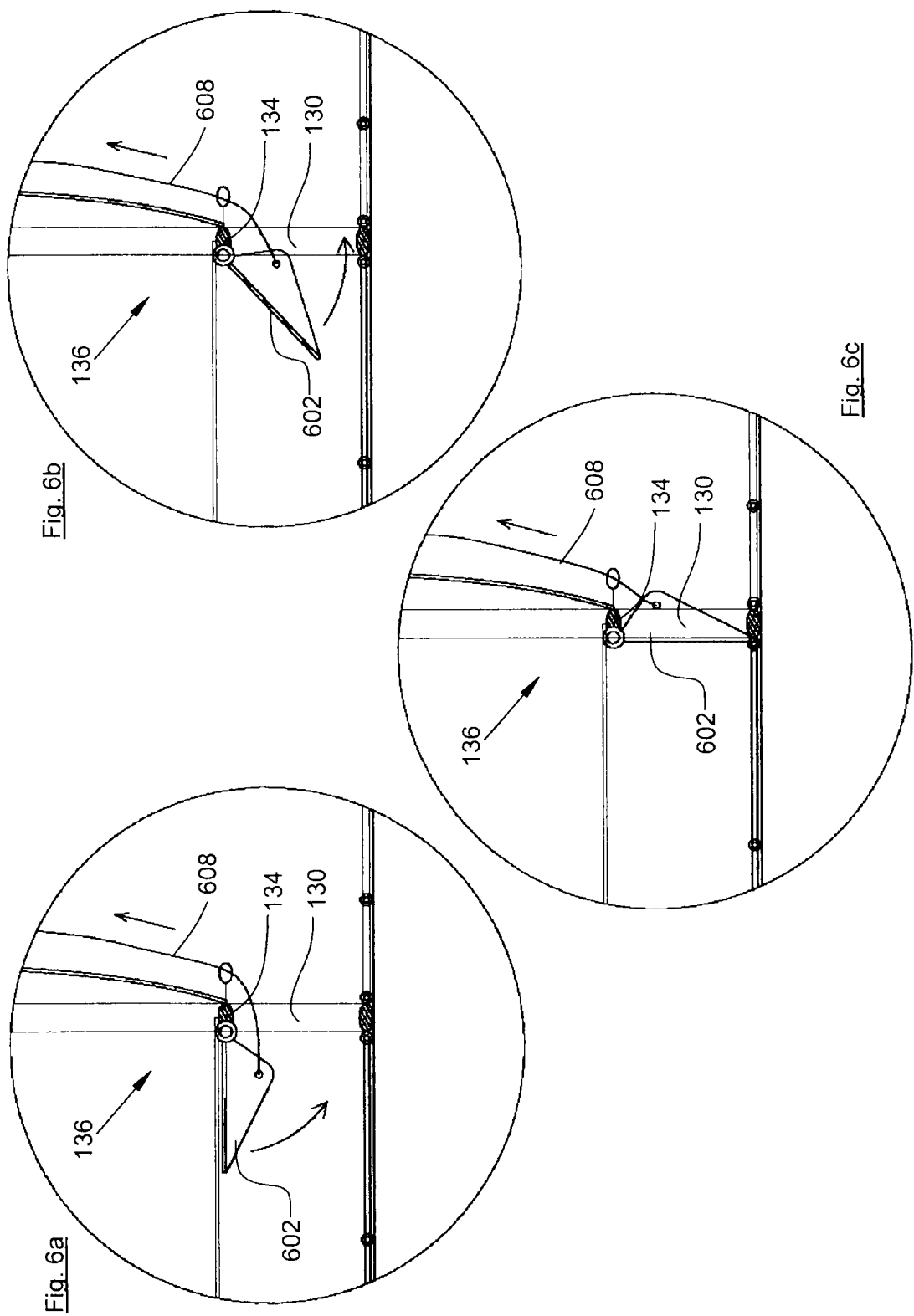
FIGS. 6a to 6c show different positions of a second obturation device of the device for picking up floating objects according to the invention.

FIG. 6*a* shows the second obturation device 136 in the open position. FIG. 6*b* shows the second obturation device 136 in the course of obturation. FIG. 6*c* shows the second obturation device 136 in the obturation position. The second obturation device 136 comprises a closure flap 602 mounted at the top part of the discharge orifice 130, for example on the holding bar 134 by means of a hinge with a horizontal axis perpendicular to the direction of progress of the picking-up device 100.

The closure of the closure flap 602 and consequently of the second obturation device 136 is obtained by activation of activation means that can be controlled from the surface, such as for example a haulage cable 608, one end of which is fixed to the closure flap 602 and the other end of which is available from the surface of the water 10, for example at a mast 154 disposed at the rear of the picking-up device 100. Guidance of the haulage cable 608 between the closure flap 602 and the mast 154 is provided by collars fixed to the envelope 124 and inside which the haulage cable 608 passes.

The direction of haulage of the haulage cable 808 and the closure movement of the closure flap 602 are shown by arrows in the various FIGS. 6*a*, 6*b* and 6*c*.

Opening of the closure flap 602 and consequently of the second obturation device 136 is obtained by means of a return spring that forces the closure flap 602 into the open position when the haulage cable 608 is released.

Figure 5:
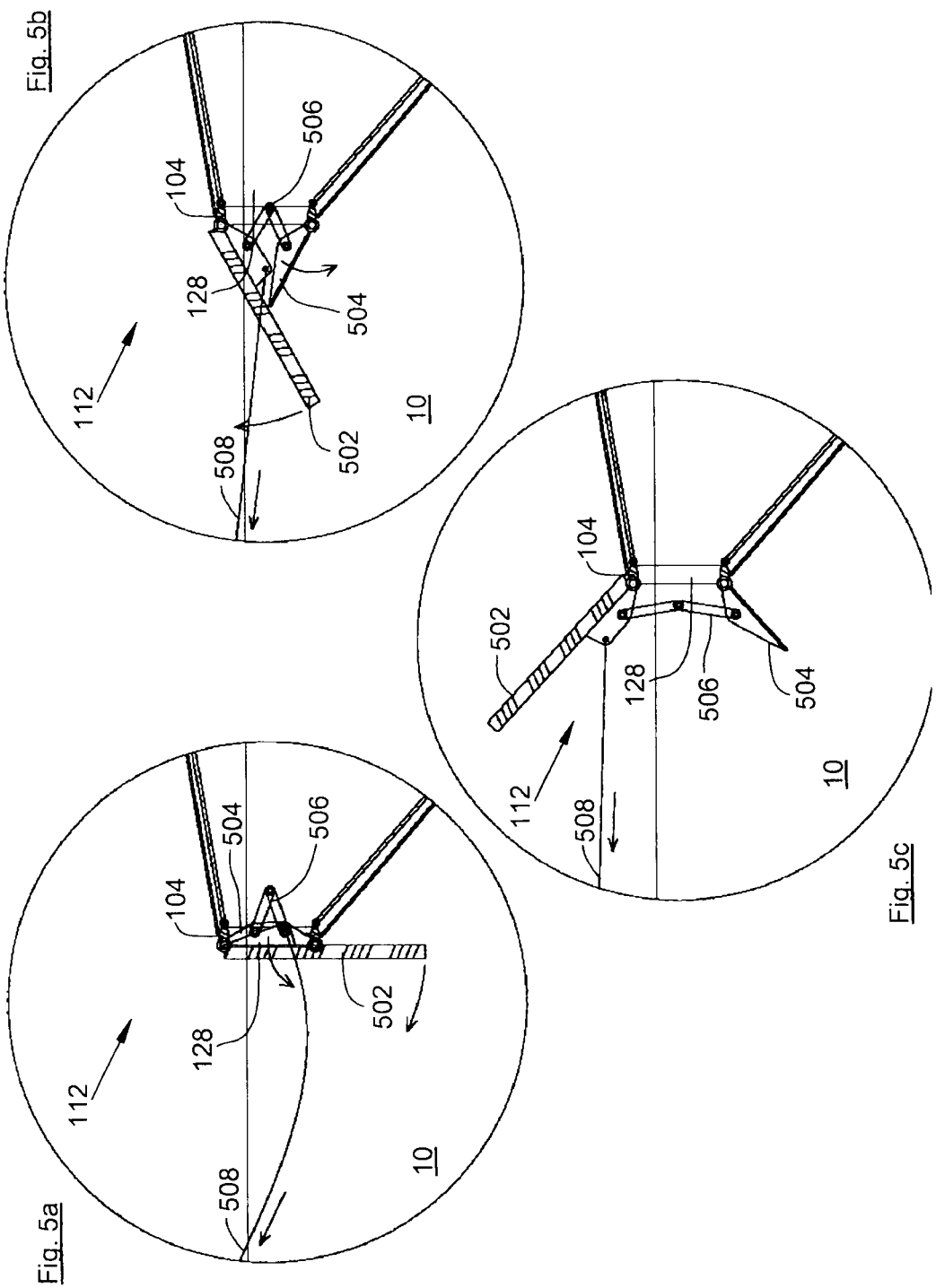
FIGS. 5a to 5c show different positions of a first obturation device of the device for picking up floating objects according to the invention.

FIG. 5*a* shows the first obturation device 112 in the obturation position. FIG. 5*b* shows the first obturation device 112 in the course of opening. FIG. 5*c* shows the first obturation device 112 in the open position. The first obturation device 112 comprises a deflection flap 502 mounted at the top part of the mouth 128, for example on the upstream ring 104 that delimits the mouth 128 by means of a hinge with a horizontal axis perpendicular to the direction of progress of the picking-up device 100.

In the obturation position, the deflection flap 502 comes into abutment against this upstream ring 104 so as to close off the mouth 128. In the open position, the free end of the deflection flap 502 is raised and is positioned above the surface of the water 10. The deflection flap 502 is designed so as to float in order to prevent immersion of the mouth 128 and flattens out waves during the picking-up phase, as shown in FIG. 3, and thus guides the floating objects 304 inside the mouth 128.

In order best to guide the floating objects, a plunge flap 504 is mounted at the bottom part of the mouth 128, for example on the upstream ring 104 that delimits the mouth 128 by means of a hinge with a horizontal axis perpendicular to the direction of progress of the picking-up device 100.

In the obturation position, the plunge flap 504 is housed inside the upstream ring 104. In the open position, the free end of the plunge flap 504 is lowered and plunges under the water 10. The plunge flap 504 is designed so as to sink in order to avoid lifting the mouth 128 and guides the water 10 and floating objects 304 inside the mouth 128.

In order to manoeuvre the deflection flap 502 and plunge flap 504 easily and simultaneously, a set of links 506 is mounted between the two flaps 502 and 504. A first link is mounted so as to rotate freely on the deflection flap 502, a second link is mounted so as to rotate freely on the plunge flap 504 and the free ends of the two links are mounted so as to rotate freely one with the other. Thus the opening or respectively the closure of the deflection flap 502 causes the opening or respectively the closure of the plunge flap 504.

Opening of the deflection flap 502 and consequently of the first obturation device 112 is obtained by activation of activation means that can be controlled from the surface, such as for example a haulage cable 508, one end of which is fixed to the deflection flap 502 and the other end of which is available from the surface of the water 10, for example at the mast 152.

The direction of hauling of the haulage cable 508 and the opening movements of the deflection flap 502 and plunge flap 504 are shown by the arrows in the various FIGS. 5*a*, 5*b* and 5*c*.

Closure of the deflection flap 502 and consequently of the first obturation device 112 is obtained by means of a return spring that forces the deflection flap 502 into the obturation position when the haulage cable 508 is released.

The functioning of the picking-up device 100 is as follows.

The picking-up device 100 is transported in the folded position as shown in FIG. 1 to the site where the picking up is to be performed.

When the picking-up device 100 is in the water 10, the first obturation device 112 is in the obturation position, the valve 406 is closed and the second obturation device 136 is in the open position, thus enabling the folded envelope 124 to be filled with water.

The compressed gas generation devices are activated by activating the appropriate switch for releasing the compressed gas and inflating each inflatable tube 140. During the inflation phase (FIG. 2), the extension of the inflatable tubes 140 causes the deployment of the foldable framework 101. This deployment causes a pull of air inside the envelope 124. Because of this pull of air, the valve 406 is pressed against the opening 414 and the first obturation device 112 remains in the obturation position. The air is thus prevented from entering the envelope 124. The envelope 124 then fills with water 10 solely because the second obturation device 136 is in the open position. The arrow 160 shows the entry of water inside the envelope 124 through the discharge orifice 130.

At the end of the inflation phase, the envelope 124 and the foldable framework 101 are fully deployed and the envelope is mainly filled with water 10 rather than air, which would have had consequences on the position of its water line and on the wind impact thereof.

The picking-up device 100 is then coupled to one or two boats by means of towing cables and floating barrages and is towed as far as the picking-up site.

The first obturation device 112 is then manoeuvred by means of the haulage cable 508 in order to go into the open position. The movement of the picking-up device 100 causes the creation of the current of water 302 and the picking up of the floating objects 304 in the envelope 124. Maintenance of the tension in the haulage cable 508 keeps the first obturation device 112 in the open position.

When the picking up is finished and the envelope 124 is full, the haulage cable 508 is released, which, by means of the return spring, causes the return of the first obturation device 112 into the obturation position. The second obturation device 136 must be manoeuvred by means of the activation cable 608 in order to go into the obturation position. The envelope 124 is then closed and can be transported as far as the emptying zone.

To facilitate cleaning of the envelope 124, the latter is lined inside with a lining that covers the internal volume of the envelope 124. The envelope 124 then keeps its structural function, and the function of storage volume of the floating objects 304 is fulfilled by the lining, which can be produced from a less strong, less expensive and more easily recyclable material.

After emptying of the lining, the latter can be removed, destroyed or recycled, without its being necessary to change the envelope 124, giving rise to a lower cost.

For this purpose, the envelope 124 has an access at the rear, for example of the tent flap type with a zip fastener, which makes it possible to access the inside of the envelope 124. The lining is fixed removably to the framework 101 and in particular to the rings 102, 104 and 106 and optionally to the envelope 124. By accessing inside the envelope 124, a technician can attach or detach the lining.

Figure 7:
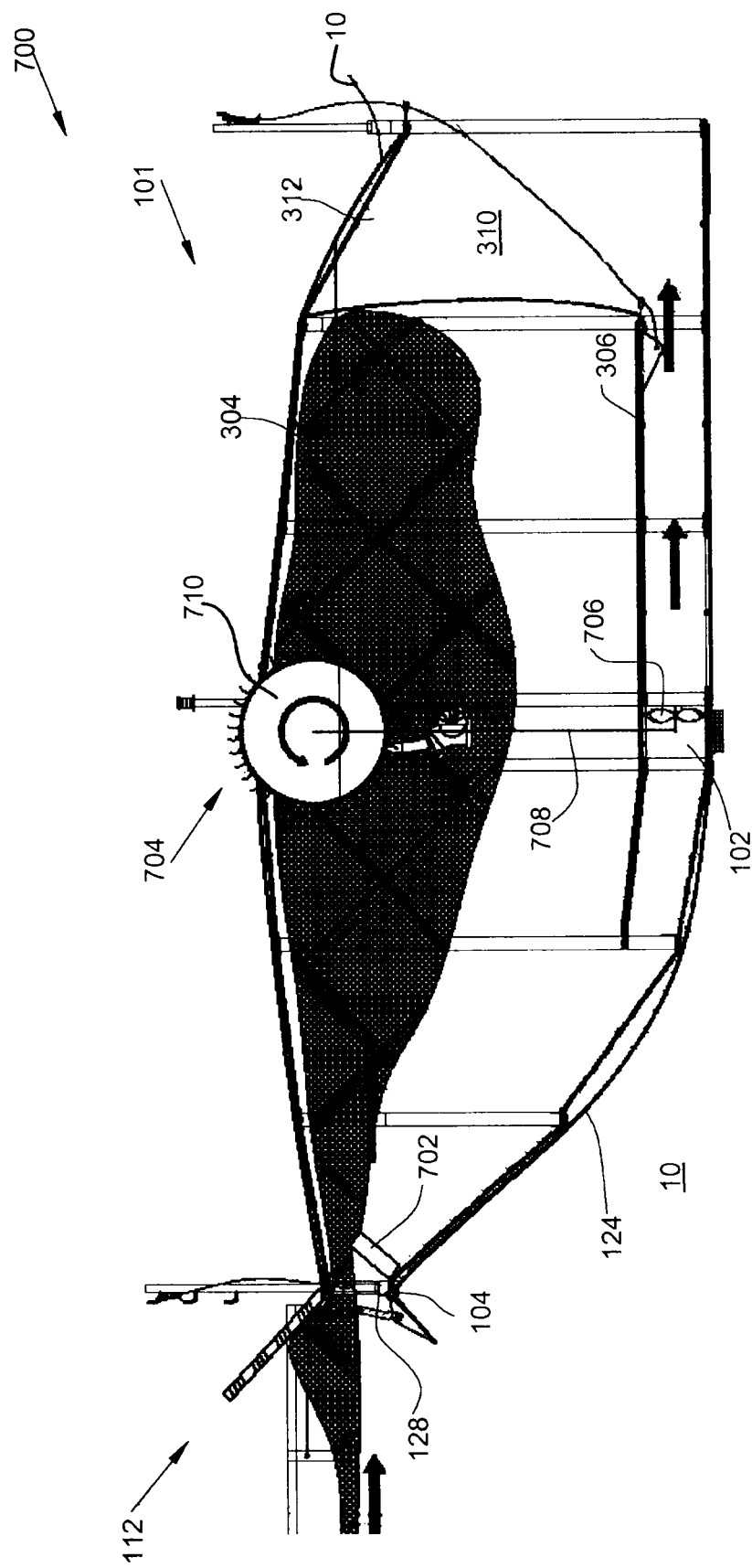
FIG. 7 is a view in partial section of a device for picking up floating objects according to another embodiment of the invention, in the picking-up position.

FIG. 7 shows a device 700 for picking up floating objects on water such as hydrocarbons according to another embodiment of the invention.

The picking-up device 700 is disposed in the water 10 and comprises:

a foldable rigid framework 101, and an envelope 124 produced from a flexible material impermeable to water and floating objects, and in which the framework 101 is disposed.

The picking-up device 700 comprises a mouth 128 upstream, and a first obturation device 112 is provided to close off the mouth 128.

Just downstream of the mouth 128, the picking-up device 700 comprises a floating flap 702 that is mounted so as to rotate freely by means of a hinge fixed to its base and has a horizontal axis perpendicular to the direction of progress of the picking-up device 700.

According to the speed with which the water 10 enters the mouth 128, the flap 702 will pivot to a greater or lesser extent towards the rear in order to allow more or less water 10 to pass. Thus, at rest, the floating flap 702 is in the vertical position and closes off the mouth 128, preventing the water 10 and floating objects 304 from emerging from the picking-up device 700. The more the speed increases, the more the floating flap 702 tilts, and releases a large amount of space inside the mouth 128.

The negative-pressure zone 310 created by the skirt 312 facilitates the discharge of the water 10 that is in the picking-up device 700.

When the speed of the picking-up device 700 with respect to the water 10 becomes too great, this aid to the discharge of the water is no longer sufficient, and the water 10 is stored in the picking-up device 700, which may cause overflow and expulsion of the stored floating objects 304.

The prevent this phenomenon, a helix 706 is disposed in the tunnel formed by the fold 306 through which the water 10 is discharged from the picking-up device 700.

The helix 706 is fixed here at the main ring 102 and is driven in rotation by driving means 704, 708. The rotation axis of the helix 706 is parallel to the direction of progress of the picking-up device 700.

Figure 8:
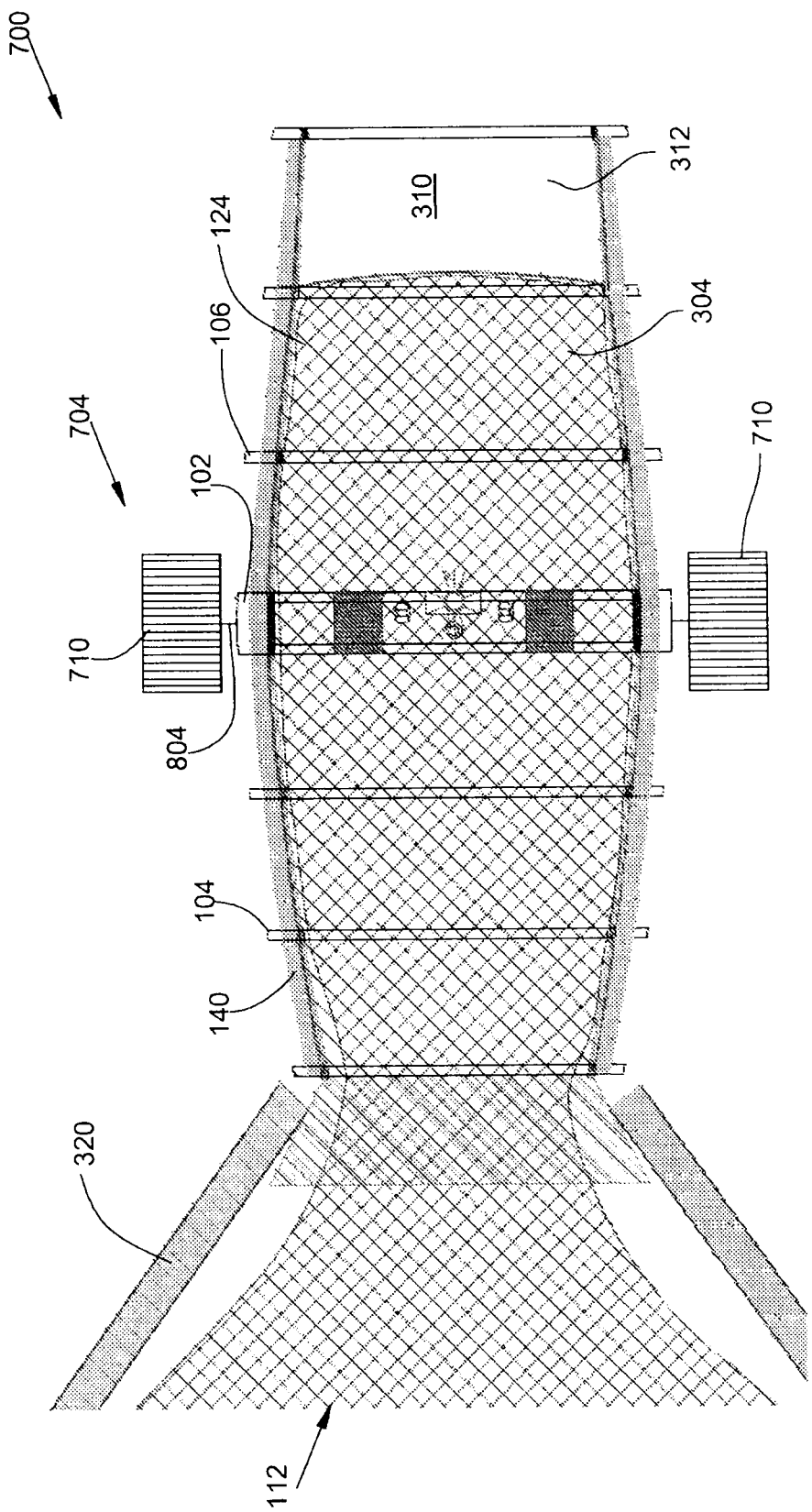
FIG. 8 is a plan view of the device for picking up floating objects of FIG. 7.

FIG. 8 shows the picking-up device 700 in plan view.

According to the embodiment of the invention presented in FIGS. 7 and 8, the driving means 704 comprise a shaft 804, at least one bladed wheel 710 (here two for reasons of balance) mounted on said shaft 804 and a set of driving bars and pinions 708 that convert the rotation of the bladed wheel or wheels 701 into a rotation of the helix 706.

The bladed wheels 710 are disposed on either side of the picking-up device 700 and are immersed in the water 10. The shaft 804 is horizontal and perpendicular to the direction of progress of the picking-up device 700 and is connected to the set of driving bars 708.

The movement of the water 10 with respect to the bladed wheels 710 causes rotation thereof, which is transmitted to the helix 706 which, by rotation, expels the water contained in the picking-up device 700.

FIG. 9 shows a detail of a picking-up device 900 at the discharge orifice 930.

The picking-up device 900 is disposed in the water 10 and comprises:

a foldable rigid framework 901, and an envelope 924 produced from a flexible material impermeable to water and floating objects, and in which the framework 901 is disposed.

The discharge orifice 930 through which the water is discharged is disposed downstream of the envelope 924 and at the exit from the tunnel formed by the fold 906 of the envelope 924.

The diameter of the discharge orifice 930 broadens going towards the downstream end of the picking-up device 900 in order to facilitate discharge of the water from said picking-up device 900.

In order to increase the negative-pressure zone 910 and to follow the profile of the discharge orifice 930, the skirt 912 is enlarged towards the bottom of the water 10. For this purpose, the downstream ring 916 that supports the largest diameter of the discharge orifice 930 is enlarged, as is the holding ring 914.

Naturally the embodiments in FIGS. 7 and 9 can be combined.

Naturally the present invention is not limited to the examples and embodiments described and depicted but is capable of numerous variants accessible to persons skilled in the art.

For example, the invention has been described particularly in the case of an envelope in two parts but, if the length of the picking-up device is too great, the envelope may comprise more than two parts. The foldable framework then comprises several main rings to which the said parts are fixed so as to form a closed assembly and between which intermediate rings are disposed having a structure similar to that of the upstream and downstream rings. The capacity of the picking-up device may then exceed 5 $m^3$ so as to be as much as 1000 $m^3$.

The invention claimed is:

1. Device for picking up floating objects on water comprising:
    an envelope produced from a flexible material impermeable to water and to floating objects, said envelope having a mouth upstream and a discharge orifice downstream,
    a foldable rigid framework, disposed inside the envelope and fixed thereto at said mouth and said discharge orifice,
    at least one inflatable tube fixed to the envelope and extending over a length of the envelope, and
    a device for generating compressed gas designed to inflate each said inflatable tube.

2. The picking-up device according to claim 1, wherein each said inflatable tube is disposed so that in a deployed position each said inflatable tube is out of the water.

3. The picking-up device according to claim 1, wherein the framework comprises a main ring, upstream rings disposed upstream of the main ring, downstream rings disposed downstream of the main ring, and extension links connecting each of said main ring, said upstream rings, and said downstream rings to at least one adjoining ring.

4. The picking-up device according to claim 3, wherein dimensions of the upstream rings decrease going towards a front of the picking-up device.

5. The picking-up device according to claim 3, wherein the downstream ring furthest downstream supports a holding bar to which a part of the envelope forming an upper limit of the discharge orifice is fixed.

6. The picking-up device according to claim 5, wherein said part is extended towards a front of the envelope and wherein an extension thereof is fixed to the main and downstream rings and passes through by fixing bars so as to form a tunnel.

7. The picking-up device according to claim 6, further comprising a helix disposed in said tunnel and a rotation axis of said helix being parallel to a direction of progress of the picking-up device, and driving means for driving said helix in rotation.

8. The picking-up device according to claim 7, wherein the driving means comprise a shaft, at least one bladed wheel mounted on said shaft, and a set of driving bars and pinions that convert the rotation of the at least one bladed wheel into a rotation of the helix.

9. The picking-up device according to claim 1, further comprising a first obturation device designed to adopt alternately an obturation position in which nothing can enter through the mouth and an open position in which the water and the floating objects can enter the mouth and activation means that can be controlled from the surface.

10. The picking-up device according to claim 9, wherein the first obturation device comprises a deflection flap mounted at a top part of the mouth by means of a hinge with a horizontal axis perpendicular to a direction of progress of the picking-up device.

11. The picking-up device according to claim 10, wherein the deflection flap floats.

12. The picking-up device according to claim 10, wherein the first obturation device comprises a plunge flap mounted at a bottom part of the mouth by means of a hinge with a horizontal axis perpendicular to the direction of progress of the picking-up device.

13. The picking-up device according to claim 12, wherein the plunge flap sinks.

14. The picking-up device according to claim 9, further comprising, just downstream of the mouth, a floating flap mounted so as to rotate freely about a horizontal axis perpendicular to the direction of progress of the picking-up device.

15. The picking-up device according to claim 1, further comprising an obturation device designed to adopt alternately an obturation position in which nothing can leave through the discharge orifice and an open position in which water can leave through the discharge orifice, and comprising activation means that can be controlled from the surface.

16. The picking-up device according to claim 1, further comprising a skirt extending towards a rear in line with the envelope and a free edge of which is sufficiently rigid to stay open.

17. The picking-up device according to claim 1, wherein a cross section of the mouth is less than or equal to a cross section of the discharge orifice.

18. The picking-up device according to claim 1, further comprising floats fixed at a top part of the envelope.

19. The picking-up device according to claim 1, further comprising a ballast fixed to a base of the picking-up device.

20. The picking-up device according to claim 1, wherein the envelope has an access for accessing an inside of the envelope and wherein the picking-up device comprises a lining covering an internal volume of the envelope and removably fixed to the framework and optionally to the envelope.

21. The picking-up device according to claim 1, further comprising a vent including a body and a float, the body being fixed by a base and having a top stop and a bottom stop positioned between said base and said top stop, and the float being disposed inside the body between the bottom stop and the top stop.

22. The picking-up device according to claim 1, wherein a diameter of the discharge orifice broadens going towards a downstream end of the picking-up device.

\* \* \* \* \*